Patented Sept. 24, 1940

2,215,637

UNITED STATES PATENT OFFICE 2,215,637

DISAZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application May 9, 1939,
Serial No. 272,681

7 Claims. (Cl. 260—186)

This invention relates to the preparation of a new series of polyazo dyestuffs. More particularly it relates to disazo dyes containing phosphorus.

I have discovered that a valuable series of water-soluble disazo dyes suitable for the coloration of organic derivatives of cellulose, silk and wool can be prepared by coupling various coupling components with the diazonium derivatives of the following general type of aromatic amines containing the phosphonic acid group.

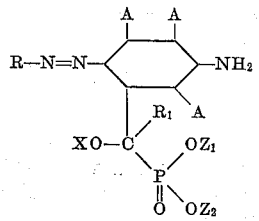

wherein R represents an aromatic nucleus, $R_1$ represents hydrogen, alkyl, alkylene, aryl, cycloalkyl, or heterocyclic groups, X represents hydrogen or an acyl group, each A represents hydrogen or a monovalent substituent and $Z_1$ and $Z_2$ represent hydrogen, an ammonium radical, or an alkali forming metal. When $R_1$ is "alkyl," it includes the unsubstituted alkyl groups such as methyl, ethyl, propyl, butyl, as well as substituted alkyl groups such as hydroxyethyl, dihydroxypropyl, methoxyethyl, ethoxyethyl, sulfoethyl, sulfatoethyl; when $R_1$ is "aryl" it includes phenyl, tolyl, xylyl, cresyl, nitro phenyl, chlorophenyl, sulfophenyl, and the like groups; when $R_1$ is "alkylene" it includes ethylene, propylene, butylene, and amylene groups; when $R_1$ is "cycloalkyl" it includes cyclohexyl, and tetrahydronaphthalene; and when $R_1$ is "heterocyclic" it includes tetrahydrofurfuryl and pyrazolone.

The chemical structure of my new disazo dyes which are prepared by diazotizing the above described type of amino azo compound coupling with various suitable coupling components may be represented by the general formula:

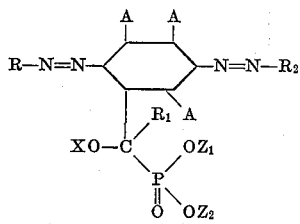

wherein R, $R_1$, X, A, A, A, $Z_1$, and $Z_2$ have the meanings above given, and $R_2$ represents aromatic, hydroaromatic and heterocyclic nuclei, and also their derivatives containing the group —CO—CO—$CH_2$—CO—$CH_2R_3$ wherein $R_3$ represents hydrogen, alkyl, alkylene, cycloalkyl, and aryl groups, as nuclear substituents.

It is an object, therefore, of my invention to prepare the dyes of the class above described and to color cellulose organic derivatives, silk and wool in the form of threads, yarns, filaments, and fabric materials therewith. Another object is to use the dyes of my invention for coloring resinous materials, lacquers, mineral and vegetable oils.

Briefly, the amino azo compounds used in the invention as the diazo components are prepared by coupling various aromatic diazonium salts with couplers containing a phosphonium group:

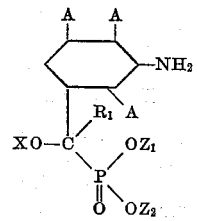

wherein $R_1$, X, A, A, A and $Z_1$ and $Z_2$ have the same meanings as those given in the preceding formulae. The coupling components are prepared by the following general procedure:

An aromatic hydrocarbon, containing one or more monovalent substituents or not such as benzene, toluene, o-xylene, anisol, chlorobenzene, and the like, is converted to the corresponding aldehyde by reaction with carbon monoxide in the presence of a catalyst. The resulting aldehyde is nitrated to the meta-nitro-aldehyde, and the latter then treated with phosphorus trichloride in an acetic acid solution following in general a method similar to that described by J. B. Conant and A. D. MacDonald, in the Journal of the American Chemical Society 42 2337 (1920). The phosphonic acid derivative thus obtained is then reduced to the corresponding amine, either by chemical reduction with zinc and hydrochloric acid, or by catalytic reduction with nickel and hydrogen. For a more detailed description reference should be made to my copending U. S. Application Serial No. 268,822, filed April 19, 1939.

The following examples serve to illustrate the preparation of the disazo compounds of my invention.

Example 1

One mole of 1'-chloro-4-amino-2-hydroxy methyl phosphonic acid—azo benzene is dissolved in water containing hydrochloric acid, and diazotized with 6.9 grams of sodium nitrite in the usual manner. When diozotization is complete, the diazo solution is added to an aqueous sodium carbonate solution of 140 grams of 5,5-dimethyl-cyclohexandione-1,3. After the coupling reaction is complete, the mixture is made acid to litums with acetic acid and the sodium salt of the dye is salted out, filtered, and dried. The dye thus prepared colors cellulose acetate, silk and wool yellow from an aqueous solution of the dye which may contain salt. The diazo dye compound has the structural formula:

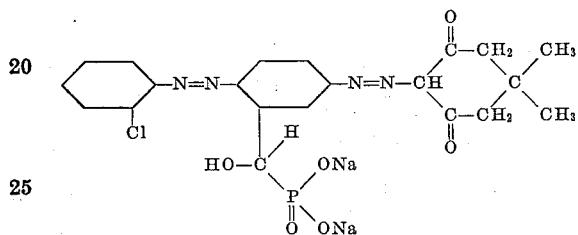

In place of 5,5-dimethyl-1,3-cyclohexandione, there may be substituted 5,5-diethyl-1,3-cyclohexandione, 5,5-dibutyl-1,3-cyclohexandione, 5-phenyl sulfonic acid-1,3-cyclohexandione, 3,5-furyl-1,3-cyclohexandione, 1-phenyl sulfonic acid-3-methyl-5-pyrozolone, 3-methyl-5-pyrazolone, barbituric acid, thiobarbituric acid, indole, oxindole, and couplers of the type:

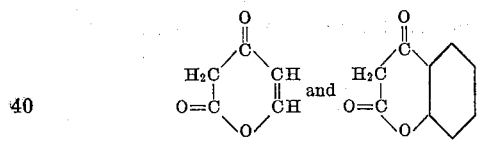

Example 2

One mole of 1'-chloro-4-amino-5-methoxy-2-hydroxy methyl phosphonic acid-azobenzene is diazotized and added slowly to a dilute hydrochloric acid solution of cresidine. The coupling is completed by adding an aqueous solution of a basic salt such as sodium acetate, sodium carbonate, and the like. The dye is then salted out, filtered and dried. It colors cellulose acetate, silk and wool orange shades from an aqueous solution of the dye which may contain salt. The diazo dye thus produced has the structural formula:

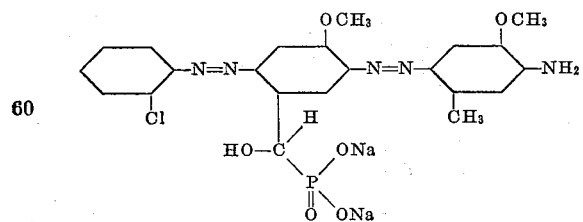

In place of cresidine, there may be used m-toluidine, m-anisidine, 2,5-dialkoxy aniline, 2,5-dialkyl aniline, 2-alkoxy-5-haloaniline, m-phenylene diamine producing red shades, m-amino phenol, and α-naphthylamine.

Diazo dyes of the above kind containing a free amino group are capable of being further diazotized and recoupled with another coupling component, either in solution or on the fiber to be colored.

Example 3

One mole of 4'-nitro-4-amino-2-methyl acetoxy methyl phosphonic acid-azobenzene is diazotized and coupled with one equivalent of butyl-m-toluidine following the procedures of Examples 1 and 2. The dye colors cellulose acetate silk and wool red from aqueous solutions of the dye which may contain salt. The disazo dye compound thus produced has the structural formula:

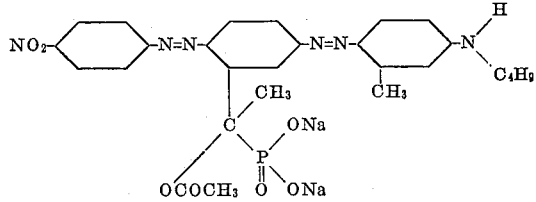

In place of butyl-m-toluidine there may be substituted cetyl-m-toluidine, benzyl-m-anisidine, ethyl cresidine, γ-methoxy-propyl aniline, glyceryl-2-methoxy-5-chloro-aniline, sodium-B-sulfoethyl 2,5-dialkoxy aniline, sodium phosphato ethyl-2,5-dialkyl aniline, m-ethoxy-cyano methyl aniline, and β-methoxy-ethyl aniline.

Example 4

One mole of the following p-amino-polyazo compound:

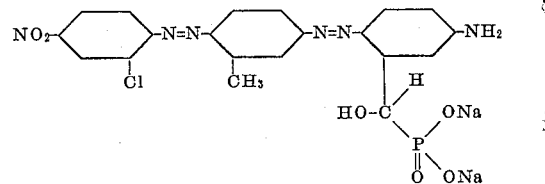

is diazotized and coupled with one mole of dimethyl aniline in the manner described in Example 2. The dye colors cellulose acetate, silk and wool red from an aqueous solution of the dye which may contain salt. In place of dimethyl aniline there may be used methyl butyl aniline, ethyl lauryl-m-toluidine, butyl-hydroxyethyl cresidine, benzyl glyceryl-m-chloroaniline, and coupling components of the following structures:

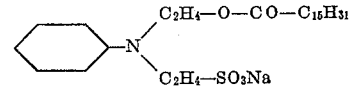

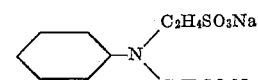

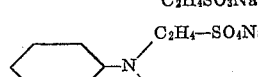

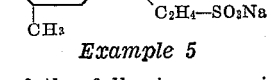

Example 5

One mole of the following p-amino azo compound:

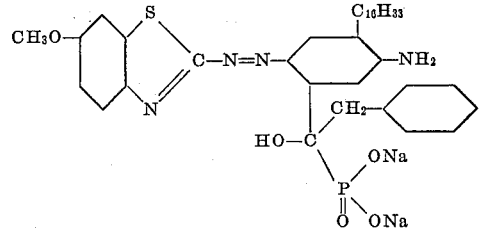

is diazotized and coupled with one mole of 1-amino-8-naphthol following the procedure of Example 2. Cellulose acetate, silk and wool are colored reddish-blue shades from aqueous solutions of the dye. The disazo compound thus obtained has the formula:

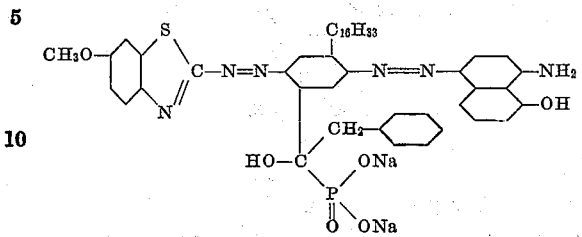

In place of 1-amino-8-naphthol there may be substituted 1-amino-5-naphthol, 1-amino-6,8-dichloro-5-naphthol, 1-β-hydroxethylamino-5-naphthol, and ethyl sodium sulfoethyl-α-naphthylamine.

*Example 6*

One mole of the following p-diamino azo compound:

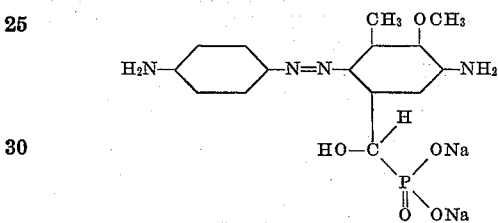

is diazotized and coupled with one mole of di-β-hydroxyethyl aniline following the procedure of Example 1. The dye colors cellulose acetate, silk and wool red shades from aqueous solutions of the dye which may contain salt.

In place of di-β-hydroxyethyl aniline there may be substituted the coupling components of Examples 1-5, naphthol sulfonic acids, amino naphthol sulfonic acids, naphthylamine sulfonic acids, 2-hydroxy-3-naphthoic acid and its amides and esters, and 2-hydroxyanthracene-3-carboxylic acid.

*Example 7*

One mole of the following p-amino azo compound:

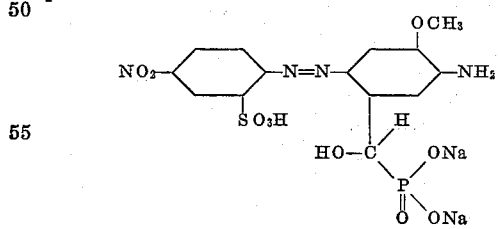

is diazotized and coupled with one mole of any of the coupling components mentioned in the preceding examples following the procedure of Examples 1 and 2.

The azo dyes of my invention being water-soluble they may be used for the direct coloration of organic derivatives of cellulose, silk and wool in the form of threads, yarns, filaments and fabric materials without the necessity of employing a dispersing or solubilizing agent. The dyeing operations will be conducted in accordance with the usual dyeing practice, salt being added if desired to facilitate exhaustion of the dye bath. For a more detailed description as to how the water-soluble azo dyes of my invention may be employed for the coloration of textile materials, reference may be had to U. S. Patent No. 2,107,898 issued February 8, 1938.

Typical organic derivatives of cellulose include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

I claim:

1. The azo compounds having the general formula:

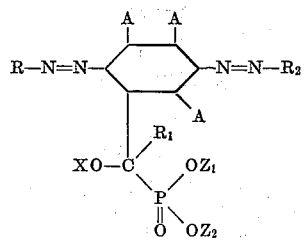

wherein R represents a member selected from the group consisting of an aryl group of the benzene series, and a benzothiazole nucleus, $R_1$ represents a member selected from the group consisting of hydrogen, an alkyl group, an alkylene group, a cycloalkly group, an aryl group of the benzene series, an aralkyl group, a pyrazolone group, and a furyl group, $R_2$ represents an aromatic group, a hydro aromatic group, and a heterocyclic group, X represents hydrogen or an acetyl group, each A represents a member selected from the group consisting of hydrogen, an alkyl group, and an alkoxy group, and $Z_1$ and $Z_2$ represent hydrogen, an ammonium radical, or an alkali forming metal.

2. The azo compounds having the general formula:

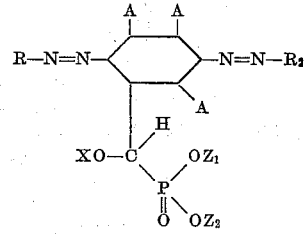

wherein R represents a member selected from the group consisting of an aryl group of the benzene series, and a benzothiazole nucleus $R_2$ represents an aromatic group, a hydro aromatic group, and a heterocyclic group, X represents hydrogen or an acetyl group, each A represents a member selected from the group consisting of hydrogen, an alkyl group, and an alkoxy group, and $Z_1$ and $Z_2$ represent hydrogen, an ammonium radical, or an alkali forming metal.

3. The azo compounds having the general formula:

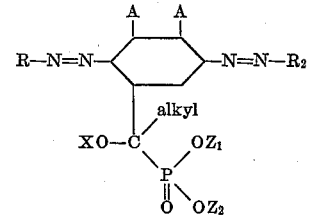

wherein R represents a member selected from the group consisting of an aryl nucleus of the benzene series, and a benzothiazole nucleus, R₂ represents an aromatic group, a hydro aromatic group, and a heterocyclic group, X represents hydrogen or an acetyl group, each A represents a member selected from the group consisting of hydrogen, an alkyl group, and an alkoxy group, and Z₁ and Z₂ represent hydrogen, an ammonium radical, or an alkali forming metal.

4. The azo compounds having the general formula:

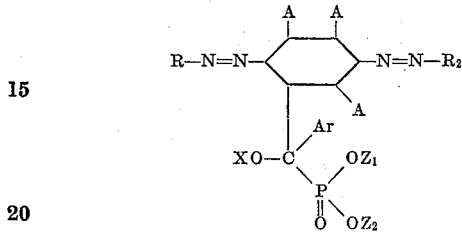

wherein R represents a member selected from the group consisting of an aryl nucleus of the benzene series, and a benzothiazole nucleus, Ar represents an aryl group of the benzene series, R₂ represents an aromatic group, a hydro aromatic group, and a heterocyclic group, X represents hydrogen or an acetyl group, each A represents a member selected from the group consisting of hydrogen, an alkyl group, and an alkoxy group, and Z₁ and Z₂ represent hydrogen, an ammonium radical, or an alkali forming metal.

5. The azo compounds having the general formula:

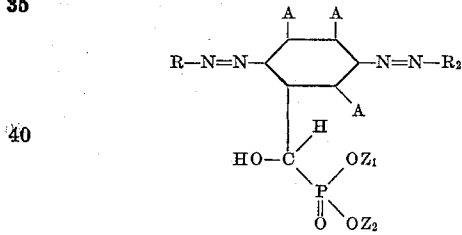

wherein R represents a member selected from the group consisting of an aryl nucleus of the benzene series, and a benzothiazole nucleus, R₂ represents an aromatic group, a hydroaromatic group, and a heterocyclic group, each A represents a member selected from the group consisting of hydrogen, and an alkyl group, and an alkoxy group, and Z₁ and Z₂ represent hydrogen, an ammonium radical or an alkali forming metal.

6. Material made of or containing organic derivatives of cellulose colored with a dye selected from the class of azo compounds having the general formula:

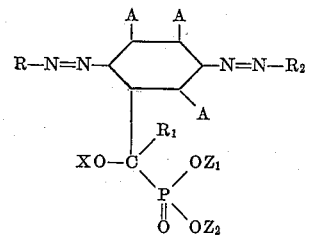

wherein R represents a member selected from the group consisting of an aryl nucleus of the benzene series, and a benzothiazole nucleus, R₁ represents a member selected from the group consisting of hydrogen, an alkyl group, an alkylene group, a cycloalkyl group, an aryl group of the benzene series, an aralkyl group, a pyrazolone group and a furyl group, R₂ represents an aromatic group, a hydro aromatic group, and a heterocyclic group, X represents hydrogen or an acetyl group, each A represents a member selected from the group consisting of hydrogen, an alkyl group, and an alkoxy group, and Z₁ and Z₂ represent hydrogen, an ammonium radical, or an alkali forming metal.

7. Material made of or containing cellulose acetate colored with a dye selected from the class of azo compounds having the general formula:

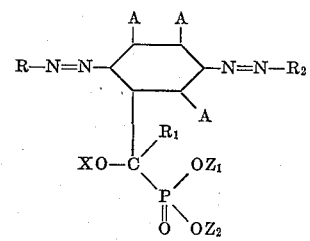

wherein R represents a member selected from the group consisting of an aryl nucleus of the benzene series, and a benzothiazole nucleus, R₁ represents a member selected from the group consisting of hydrogen, an alkyl group, an alkylene group, a cycloalkyl group, an aryl group of the benzene series, an aralkyl group, a pyrazolone group, and a furyl group, R₂ represents an aromatic group, a hydro aromatic group, and a heterocyclic group, X represents hydrogen or an acetyl group, each A represents a member selected from the group consisting of hydrogen, an alkyl group, and an alkoxy group, and Z₁ and Z₂ represent hydrogen, an ammonium radical, or an alkali forming metal.

JOSEPH B. DICKEY.

CERTIFICATE OF CORRECTION.

Patent No. 2,215,637.

September 24, 1940.

JOSEPH B. DICKEY.

It is hereby certified that error appears in the printed specification of the above numbered patent requiring correction as follows: Page 1, first column, line 42, after the word "compound" insert --and--; and second column, line 3, strike out "CO-"; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.